(12) United States Patent
Kindred

(10) Patent No.: US 9,775,273 B2
(45) Date of Patent: Oct. 3, 2017

(54) MULTI-USE GARDENING TOOL

(76) Inventor: Dave Kindred, Liberty Lake, WA (US)

(\*) Notice: Subject to any disclaimer, the term of this patent is extended or adjusted under 35 U.S.C. 154(b) by 0 days.

(21) Appl. No.: 13/239,154

(22) Filed: Sep. 21, 2011

(65) Prior Publication Data

US 2012/0067602 A1    Mar. 22, 2012

Related U.S. Application Data

(60) Provisional application No. 61/385,034, filed on Sep. 21, 2010.

(51) Int. Cl.
*A01B 1/08* (2006.01)
*A01B 1/12* (2006.01)

(52) U.S. Cl.
CPC . *A01B 1/12* (2013.01); *A01B 1/08* (2013.01)

(58) Field of Classification Search
USPC .............................. 172/371, 376, 378; D8/11
See application file for complete search history.

(56) References Cited

U.S. PATENT DOCUMENTS

| | | | | |
|---|---|---|---|---|
| 478,468 A * | 7/1892 | Rodes | ............. | 172/373 |
| 543,266 A * | 7/1895 | Parcells | ............. | 172/376 |
| 568,143 A * | 9/1896 | Parcells | ............. | 172/376 |
| 1,768,163 A * | 6/1930 | Steinour et al. | ............. | 172/381 |
| 1,870,891 A * | 8/1932 | Bristow et al. | ............. | 172/372 |
| 1,886,560 A * | 11/1932 | Lee | ............. | 172/375 |
| 1,895,055 A * | 1/1933 | Steinour et al. | ............. | 172/376 |
| 1,946,006 A * | 2/1934 | Struckmeyer | ............. | 172/375 |
| 1,954,250 A * | 4/1934 | Lee | ............. | 172/375 |
| 1,966,536 A * | 7/1934 | Bevis | ............. | 172/381 |
| 1,987,846 A * | 1/1935 | Connor | ............. | 172/375 |
| 2,364,208 A * | 12/1944 | Gravely | ............. | 172/372 |
| 3,015,930 A * | 1/1962 | Campbell | ............. | 56/239 |
| 5,046,254 A * | 9/1991 | Russell | ............. | 30/309 |
| 5,479,993 A * | 1/1996 | Bojar | ............. | 172/372 |
| 2010/0018730 A1 * | 1/2010 | Schultz | ............. | 172/371 |

\* cited by examiner

*Primary Examiner* — Alicia Torres

(74) *Attorney, Agent, or Firm* — Wells St. John P.S.

(57) ABSTRACT

A multi-use tool includes a chevron-shaped body and a coupling mechanism configured to couple a handle to the chevron-shaped body. The chevron-shaped body comprises a first external edge, a second external edge, a first internal edge and a second internal edge. A void is formed by the first internal edge, the second internal edge and the coupling mechanism. An apex of the chevron-shaped body points away from the handle.

9 Claims, 14 Drawing Sheets

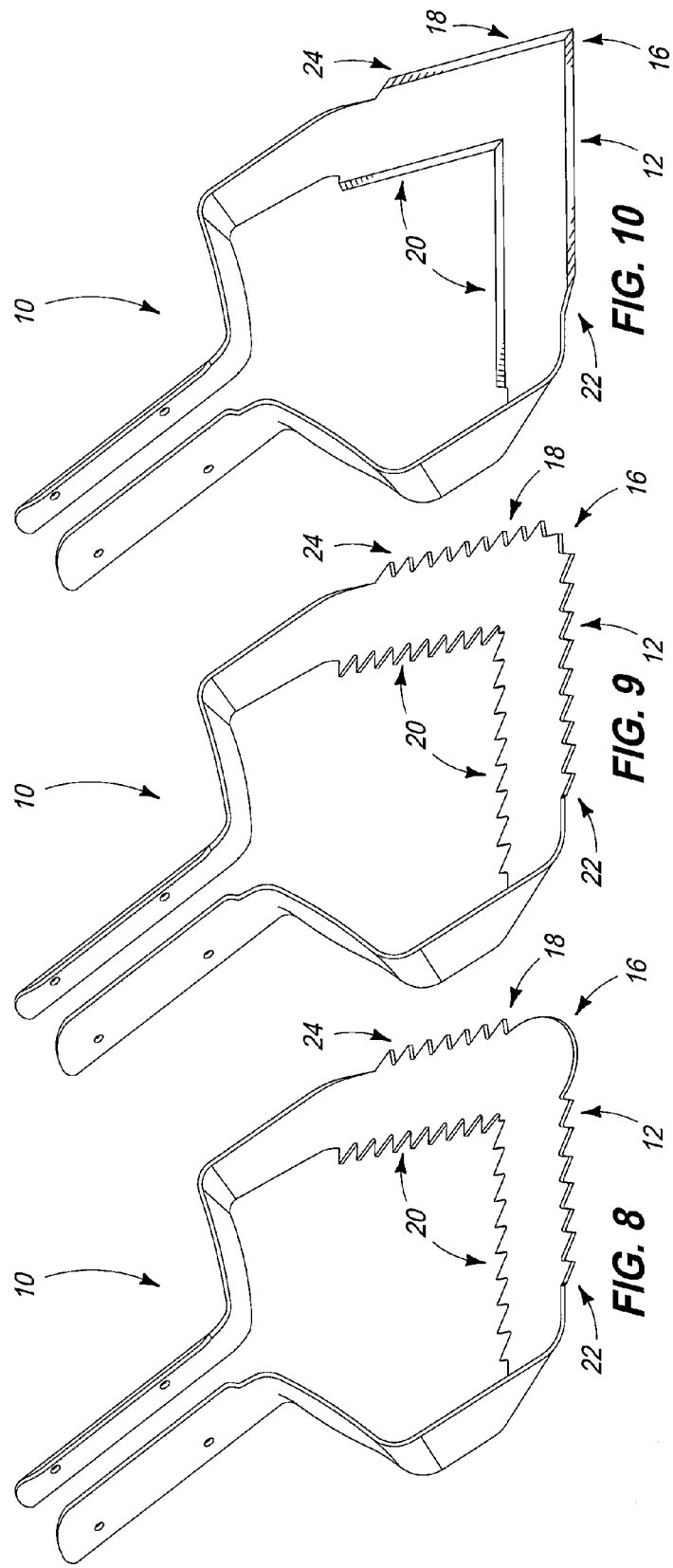

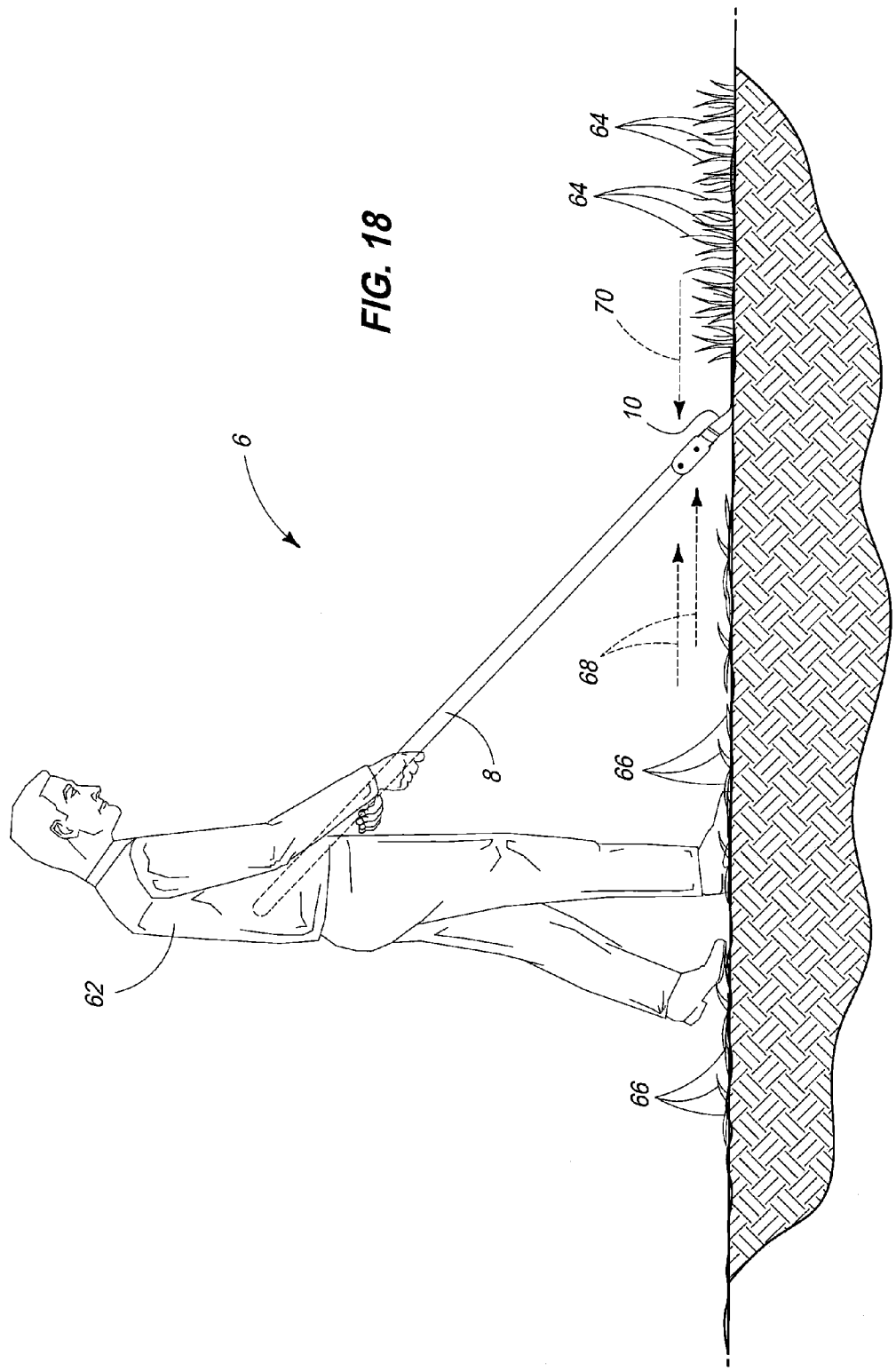

MULTI-USE GARDENING TOOL

RELATED PATENT DATA

This application claims priority to U.S. Provisional Patent Application Ser. No. 61/385,034, filed Sep. 21, 2010, entitled "Garden Tool and Methods of Use," which is incorporated herein by reference.

TECHNICAL FIELD

This disclosure relates to multi-use tools.

BACKGROUND OF THE DISCLOSURE

Tools come in many different varieties to perform different tasks. Some of the tasks may include, for example, hoeing, tilling, aerating, digging, cutting, weeding, etc. Traditionally, to perform each of the listed tasks and other tasks, a different tool was purchased and used. Adhering to this traditional approach may not only become cost prohibitive for the ordinary user, but may also lead to inefficient use of time because of the need to constantly change tools to perform the different tasks. Additionally, some tools may not perform the task with the desired simplicity.

BRIEF DESCRIPTION OF THE DRAWINGS

Exemplary embodiments of the disclosure are described below with reference to the following accompanying drawings.

FIG. 4a is a zoomed-in view of a portion of a serrated segment from FIG. 4.

FIG. 8 is an example of a tool head according to an embodiment.

FIG. 9 is an example of a tool head according to an embodiment.

FIG. 10 is an example of a tool head according to an embodiment.

FIG. 18 is an example of a user using a multi-use tool according to an embodiment.

DETAILED DESCRIPTION OF THE DISCLOSURE

Figure 1:
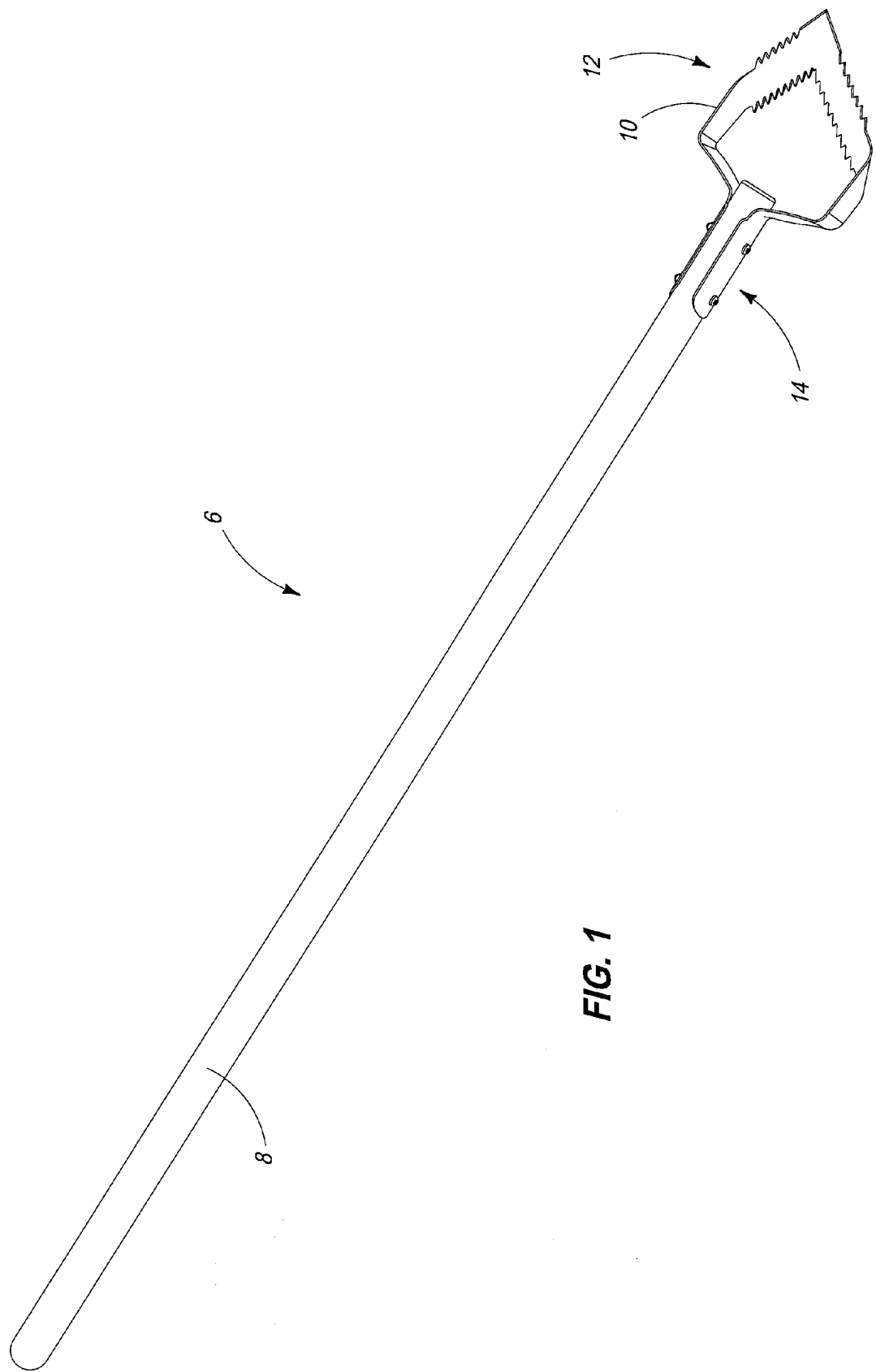
FIG. 1 is an isometric view of a multi-use tool according to an embodiment.

This disclosure is submitted in furtherance of the constitutional purposes of the U.S. Patent Laws "to promote the progress of science and useful arts" (Article 1, Section 8).

According to one aspect of the invention, a tool includes a chevron-shaped body and a coupling mechanism configured to couple a handle to the chevron-shaped body.

The chevron-shaped body may also include a leading edge and a serrated trailing edge. The leading edge may include a serrated segment and a non-serrated segment. The non-serrated segment may be located adjacent to an apex of the chevron-shaped body. According to another embodiment, the non-serrated segment may be sharpened.

The coupling mechanism may be configured to demountably couple the handle to the chevron-shaped body. A void may be formed by the trailing edge of the chevron-shaped body and the coupling mechanism.

According another aspect of the invention, a tool includes a chevron-shaped body comprising a first external edge, a second external edge, a first internal edge, and a second internal edge. The tool may also include a handle, a coupling mechanism demountably coupling the handle to the chevron-shaped body and a void formed by the first internal edge, second internal edge, and the coupling mechanism. Additionally, an apex of the chevron-shaped body may point away from the handle. In one embodiment, the apex may be rounded. At least one of the edges may be sharpened. At least one of the edges may be serrated.

In one embodiment, the serration may include a plurality of acute angles measured from at least one of the edges. Additionally or alternatively, the serration may include a plurality of angles of about 90 degrees measured from at least one of the edges.

The first internal edge may be parallel to the first external edge and the second internal edge may be parallel to the second external edge. Alternatively, the first internal edge may be unparallel to the first external edge.

According to another aspect of the invention, a tool may include a first strip of rigid material, a second strip of rigid material, and a coupling mechanism configured to couple a handle to at least one of the strips of rigid material. Furthermore, the first strip and the second strip may be held in a fixed orientation relative to one another. Additionally, the first and second strips may form an acute angle and an apex. In one embodiment, the acute angle may be about 90 degrees. Moreover, the first strip and the second strip may be located within a first plane and the coupling mechanism may be aligned with a second plane. In one embodiment, the first plane may be offset from the second plane by about 135 degrees. Finally, the first plane and the second plane may intersect. In one embodiment, the first and second strips are not in physical contact.

The tool may additionally include a first side strip of rigid material and a second side strip of rigid material coupled to the first and second strips. The tool may additionally include a void formed by the first and second side strips of rigid material, the first and second strips of rigid material, the apex, and the coupling mechanism. Furthermore, the first and second side strips may be located within a different third plane.

At least one edge of the first side strip may be sharpened and at least one edge of the second side strip may be sharpened.

The coupling mechanism may be configured to adjustably alter an angle between the first plane and the second plane.

Referring first to FIG. 1, multi-use tool 6 is shown. According to this embodiment, tool head 10 is shown comprising chevron-shaped body 12 and coupling mechanism 14. Tool head 10 is shown coupled to handle 8 via coupling mechanism 14. Multi-use tool 6 may be used to perform many different gardening related and non-gardening related tasks. For example, because of the unique shape of chevron-shaped body 12, multi-use tool 6 may be used for weeding, tilling, digging, aerating, creation of furrows, cutting turf, descaling concrete and pavement, removing hardened deposits of material, and may be used to chip away ice. See FIG. 18 and accompanying text for additional tasks that multi-use tool 6 can be used to perform.

Figure 2:
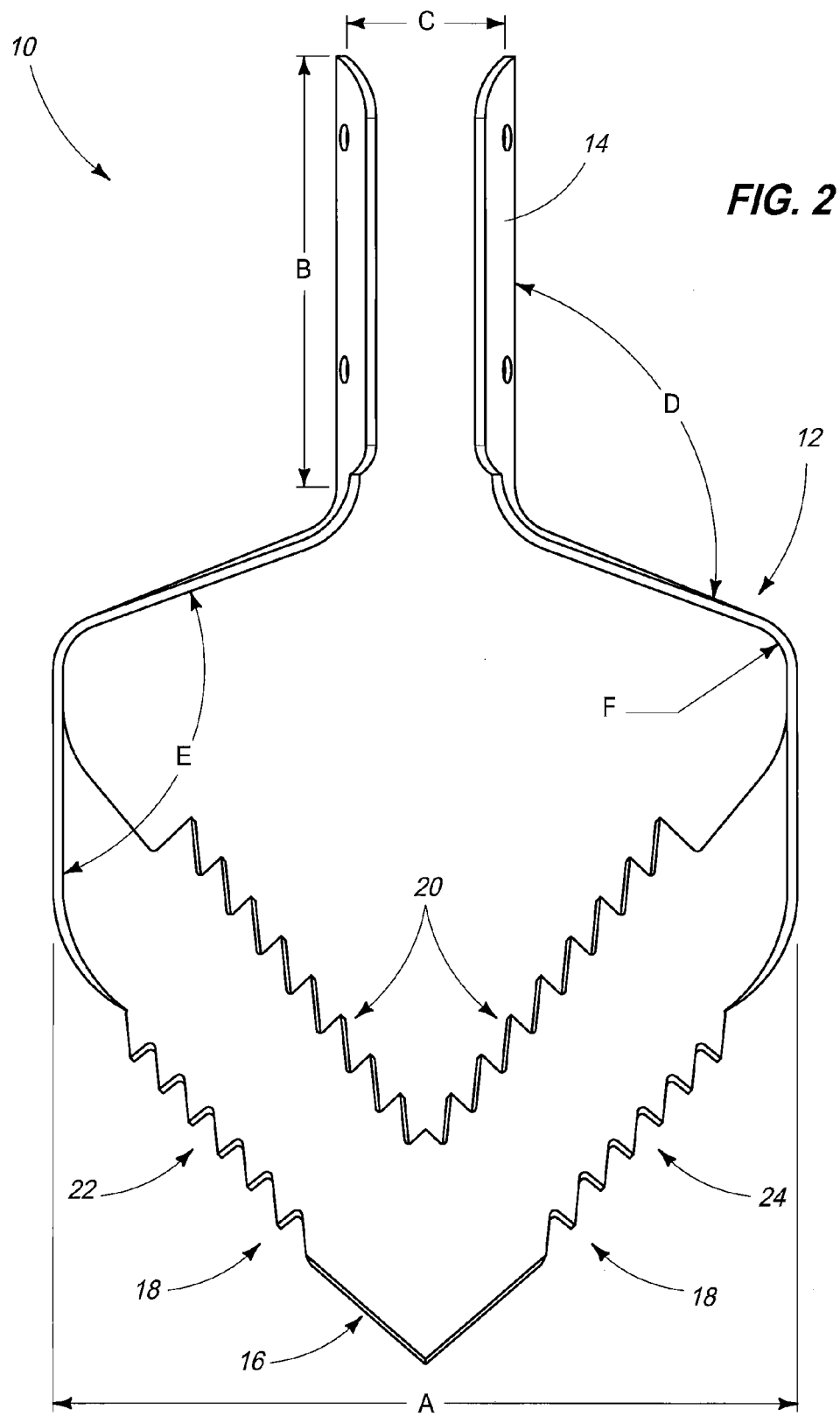
FIG. 2 is a top view of a tool head according to an embodiment.

Referring next to FIG. 2, tool head 10 is shown. According to this embodiment, tool head 10 comprises chevron-shaped body 12 and coupling mechanism 14. Width A, length B, width C, angle D, angle E, and radius F of tool head 10 are shown. Width A, according to this embodiment, is about 6.15 inches. Length B, according to this embodiment, is about 3.66 inches. Width C, according to this embodiment, is about 1.25 inches. Angles D and E, according this embodiment, are each about 110 degrees. Radius F, according to this embodiment, is about 0.375 inches. Embodiments comprising different widths A and C, length B, angles D and E, and radius F are also possible.

According to this embodiment, tool head 10 may be formed from any suitable high-tensile material and may also be hardened. An example of a high-tensile material is steel. Furthermore, tool head 10 may include apex 16, leading edge 18 (comprising serrated segment 24, apex 16, and serrated segment 22), and trailing edge 20. According to this embodiment apex 16 is not serrated. However, trailing edge 20, segment 22 and segment 24 of leading edge 18 are serrated. According to this embodiment, apex 16 provides for a convenient point to cut weeds, move gravel and soil, remove debris, aerate soil, chip ice, pierce hard materials, etc. According to other embodiments, variations of serrated and non-serrated segments may be constructed. For example, trailing edge 20, segments 22 and 24 of leading edge 18 may be sharpened, cast, or otherwise formed to a sharp point. Furthermore, apex 16 may be sharpened, cast, or otherwise formed to a sharp point.

According to this embodiment, chevron-shaped body 12 may additionally be described as being "V" shaped or triangular. Chevron-shaped body 12 is shaped in such a manner to minimize the movement of soil and other debris as user 62 performs gardening and non-gardening tasks with multi-use tool 6. The chevron shape of chevron-shaped body 12 creates leading edge 18 and trailing edge 20. This chevron shape that incorporates leading edge 18 and trailing edge 20 creates at least two working edges (leading edge 18 and trailing edge 20). Each working edge can have its own characteristics depending on multi-use tool's 6 intended purposes. For example, as described above, leading edge 18 and trailing edge 20 may be serrated, beveled, sharpened, hardened, non-serrated, or include other characteristics and may also comprise rounded segments (e.g., apex 16 may be rounded). FIG. 15 illustrates leading edge 18 as being both serrated and beveled.

Figure 3:
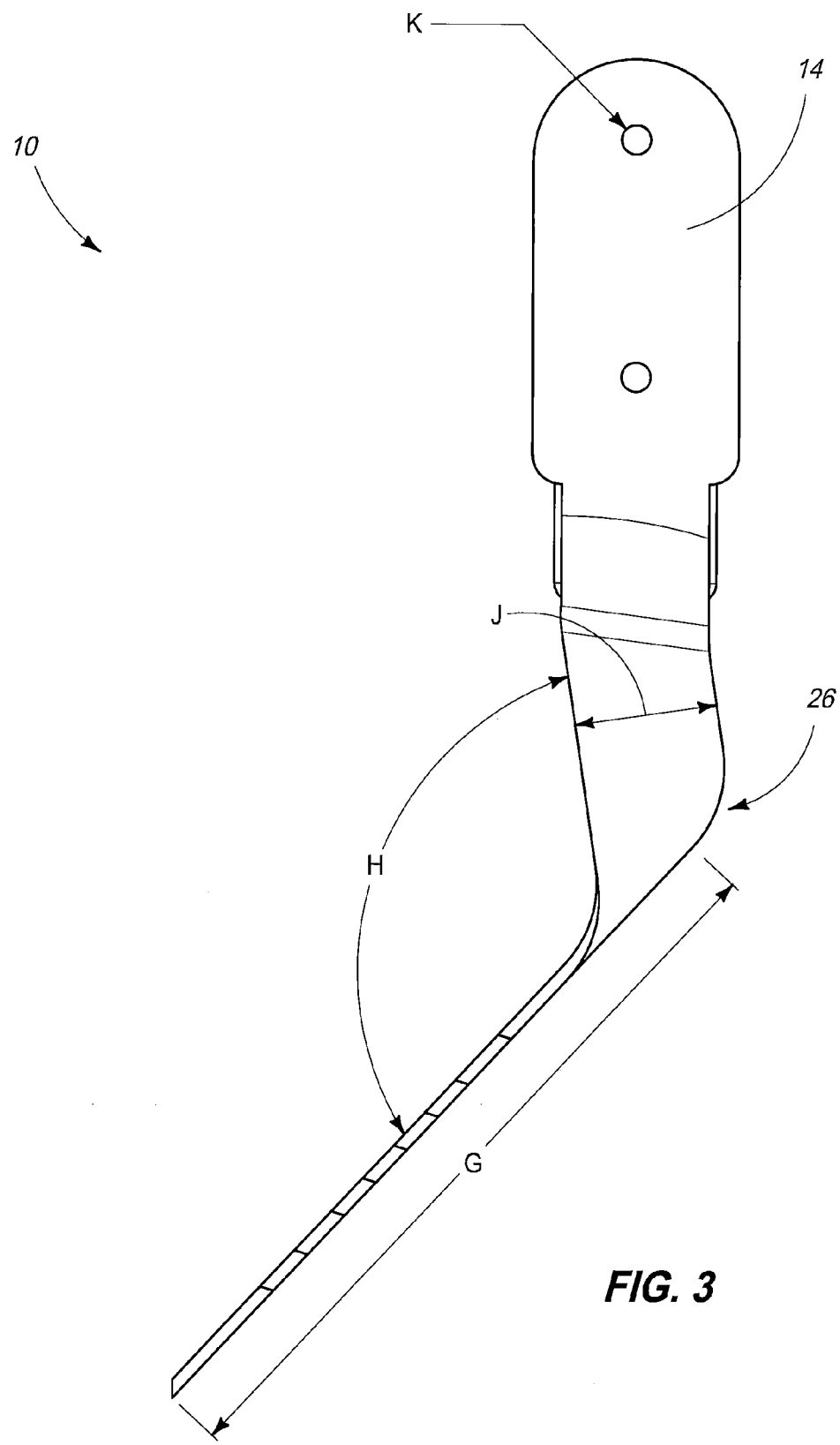
FIG. 3 is a side view of a tool head according to an embodiment.

Referring now to FIG. 3, a side view of tool head 10 is shown. According to this embodiment, length G is about 5.18 inches, angle H is about 135 degrees, width J is about 1.188 inches, and diameter K is about 0.25 inches. Embodiments comprising different lengths G, angles H, widths J, and diameters K are also possible. Angle H of head 10, for example, may enable ergonomic performance of gardening tasks when integrated into tool head 10 and coupled with handle 8 (shown in, for example, FIG. 4). When bottom portion 26 is placed on top of a work surface (i.e. grass, soil, gravel, etc.), coupling mechanism 14 extends in a direction toward user's 62 waist. The angle of this extension provides for a convenient and comfortable location from which user 62 may perform tasks.

In one embodiment, coupling mechanism 14 may be configured to adjustably alter angle H. This configuration may, for example, account for taller and shorter users. Increasing angle H may, for example, make working with the multi-use tool 6 more convenient for shorter users. On the other hand, decreasing angle H may, for example, make working with the multi-use tool 6 more convenient for taller users. In addition to making the use of the multi-use tool 6 more convenient, configuring coupling mechanism 14 to adjustably alter angle H may provide for a larger breadth of gardening and non-gardening tasks able to be performed by multi-use tool 6. For example, increasing angle H may allow user 62 to have a longer effective length from apex 16 to the end of handle 8 (not shown). This longer effective length may allow user 62, for example, to aerate soil under a large thorny bush that he would not otherwise be able to do without possibly subjecting himself to injury from the thorns.

Furthermore, the configuration to enable coupling mechanism 14 to alter angle H may comprise an angularly adjustable bracket with a set screw, an angularly adjustable coupling mechanism 14, or any other suitable configuration to enable alteration of angle H at coupling mechanism 14.

Figure 4:
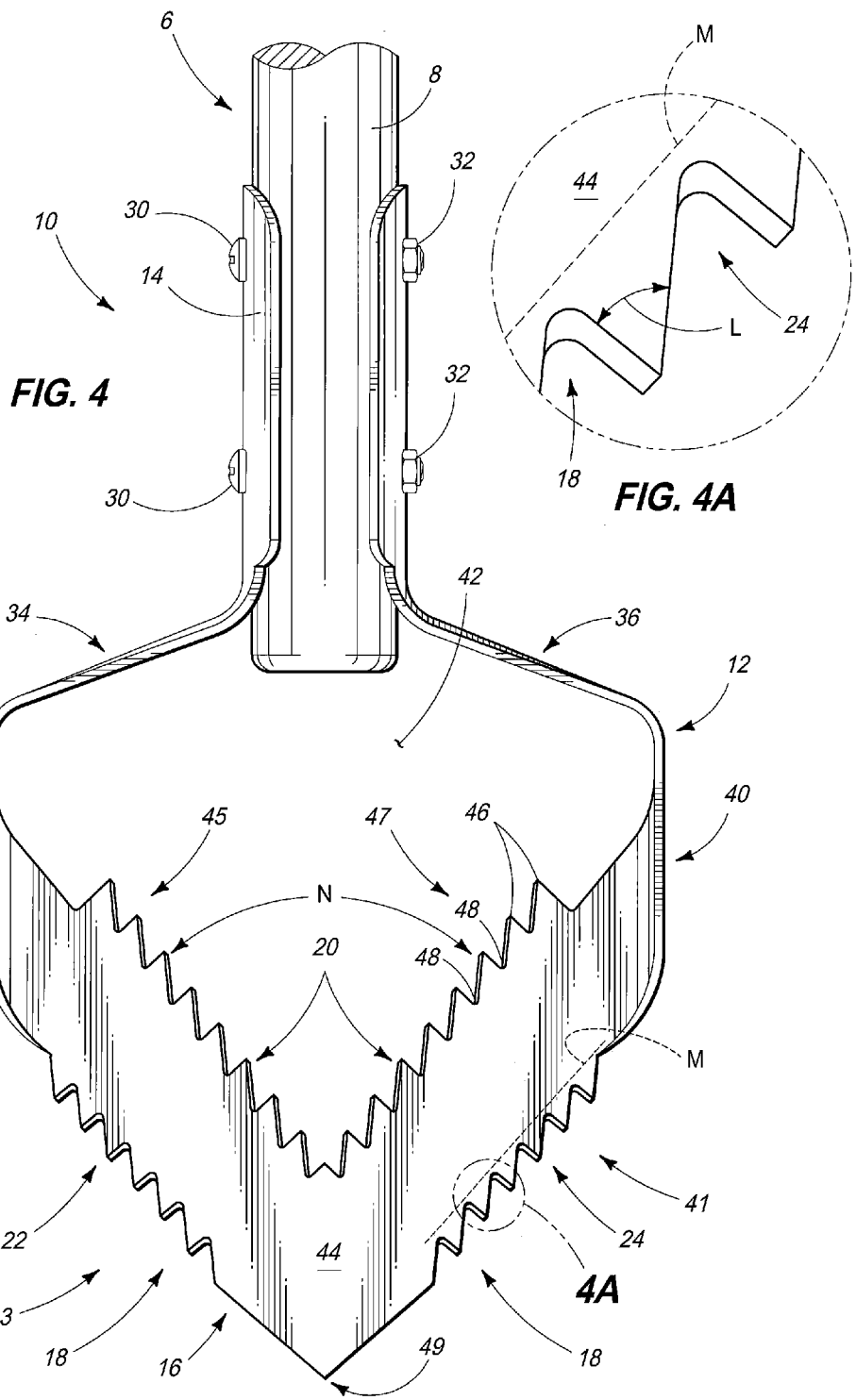
FIG. 4 is a top view of a tool head and a portion of a handle according to an embodiment.

Referring next to FIG. 4, a top view of tool head 10 is shown coupled to handle 8 via coupling mechanism 14. According to this embodiment, coupling mechanism 14 is demountably coupled to handle 8 by using two screw-type fasteners 30 and accompanying hardware 32. Screw-type fasteners 30 and accompanying hardware 32 may be constructed of stainless steel or other corrosion resistant material. They may also have a zinc coating or other similar corrosion resistant coating. According to another embodiment, other coupling configurations may include, for example, welding, other bolt-type fasteners not shown, set-screw or turn screw assemblies, female and male indexing pieces, shaft and spline indexing pieces, pressed fit or expanded fit assemblies, etc. Additionally, according to the shown embodiment, upper strip 34, upper strip 36, side strip 38 and side strip 40 are shown. Upper strips 34 and 36 are adjacent to coupling mechanism 14 and are located between coupling mechanism 14 and side strips 38 and 40. According to this embodiment, coupling mechanism 14 and side strips 38 and 40 are each aligned according to one plane.

Additionally, tool head 10 may be formed from a high-tensile strength material (e.g., steel). Furthermore, tool head 10 may be formed from one piece of rigid material or by attaching a plurality of pieces together comprising chevron-shaped body 12, side strips 38 and 40, upper strips 34 and 36, and coupling mechanism 14. Tool head 10 may also be formed from any other suitable materials arranged in a manner resembling tool head 10. According to this embodiment, tool head 10 is constructed sufficiently strong to support the weight of user 62 standing on upper strips 34 and/or 36. For example, in order to turn soil or dig out a weed user 62 may desire to apply a force directly on upper strip 34 and/or upper strip 36 via his foot. To facilitate the assertion of such a force, upper strips 34 and 36 may be sufficiently wide and have sufficient length to accept user 62 placing a first foot on upper strip 34 and a second foot on upper 36 and asserting a force in the direction of apex 16. Therefore, tool head 10 may be constructed sufficiently strong to support the weight of user 62 in asserting a force in the direction of apex 16. This force may be asserted, for example, to break up difficult soil, break up ice, or to perform any other task in need of such a force for its performance.

Moreover, tool head 10 may be constructed to not only withhold the compression forces describe above, but may also be constructed sufficiently strong to withstand bending forces. Bending forces may, for example, be created in tool head 10 when, after forcing chevron-shaped body 12 into soil, user 62 attempts to aerate soil by using a prying motion. In other examples, the bending force may be created when user 62 performs other gardening or non-gardening tasks.

Furthermore, apex 16 may be sharpened to help make the initial cut into difficult soil or other hard material easier. In addition to apex 16 being sharpened, according to this embodiment, trailing edge 20 and segments 22 and 24 of leading edge 18 are serrated.

Additionally, according to another embodiment, top portion 44 of tool head 10 is shown. Void 42 is also shown. According to this embodiment, void 42 is formed by chevron-shaped body 12, side edges 38 and 40, and coupling mechanism 14. Void 42 provides an opening to minimize the movement of soil as tool head 10 is used to perform gardening tasks. Void 42 also minimizes the build-up of soil on top of top portion 44 compared to traditional garden tools that do not have void 42. Void 42, used in conjunction with chevron-shaped body 12, may provide for more efficient performance of gardening tasks over gardening tools not incorporating void 42 and chevron-shaped body 12. According to another embodiment, void 42 may be smaller than shown in FIG. 4. Additionally, other voids in addition to void 42 may be integrated into tool head 10. Additional voids may be desirable, for example, to form a type of screen to allow particles smaller than the screen voids to fall through the screen and to not permit particles with a size larger than the voids to fall through the screen. Additional voids may also be desirable for other purposes.

According to this embodiment, coupling mechanism 14 partially encircles handle 8. Handle 8 may, for example, consist of a circular cross-section. Accordingly, coupling mechanism 14 may be constructed to demountably couple with handle 8 such that handle 8 indexes within coupling mechanism 14. However, handle 8 may also consist of a non-circular cross-section. Other arrangements of coupling mechanism 14 and handle 8 are possible. Furthermore, handle 8 may be formed such that tool 6 is balanced so that the weight of tool 6 is distributed in a way such that when a user holds tool 6 in a position for using tool 6, the user need not exert significant force to keep tool 6 in a working position because the weight of handle 8 helps keep tool head 10 in a working position.

According to another embodiment, chevron-shaped body 12 may comprise two strips of rigid material held in a fixed orientation. The segments of the edges of the two strips may be non-serrated, serrated, and/or sharpened. According to this embodiment, the two strips may or may not be in physical contact. For example, if the strips are not in physical contact then there may be a void between the ends of each of the strips. Additionally, apex 16 may be formed from the two strips and be serrated, sharpened, and/or have other characteristics.

According to the embodiment shown in FIG. 4, chevron-shaped body 12 comprises interior angle N. Interior angle N may, for example, be 90 degrees. According to other embodiments, interior angle N may be greater than or less than 90 degrees. For example, interior angle N may be an acute angle.

One description of tool head 10 has been provided above. An alternative description follows. Referring to FIG. 4, tool head 10 includes chevron-shaped body 12, which includes a first external edge 41 extending to a point 49 of apex 16, a second external edge 43 also extending to point 49, a first internal edge 47, and a second internal edge 45. According to this description, void 42 is formed by coupling mechanism 14, first internal edge 47, and second internal edge 45. Note that apex 16 and point 49 both point away from handle 8. Furthermore, in one embodiment, first external edge 41 is parallel to first internal edge 47 and second external edge 43 is parallel to second internal edge 45. In other embodiments, first external edge 41 may be anti-parallel to first internal edge 47 and second external edge 43 may be anti-parallel to second internal edge 45.

One description of tool head 10 has been provided above. An alternative description follows. Referring to FIG. 4, tool head 10 includes chevron-shaped body 12, which includes a first external edge 41 extending to a point 49 of apex 16, a second external edge 43 also extending to point 49, a first internal edge 47, and a second internal edge 45. According to this description, void 42 is formed by coupling mechanism 14, first internal edge 47, and second internal edge 45. Note that apex 16 and point 49 both point away from handle 8. Furthermore, in one embodiment, first external edge 41 is parallel to first internal edge 47 and second external edge 43 is parallel to second internal edge 45. In other embodiments, first external edge 41 may be anti-parallel to first internal edge 47 and second external edge 43 may be anti-parallel to second internal edge 45.

Figure 5:
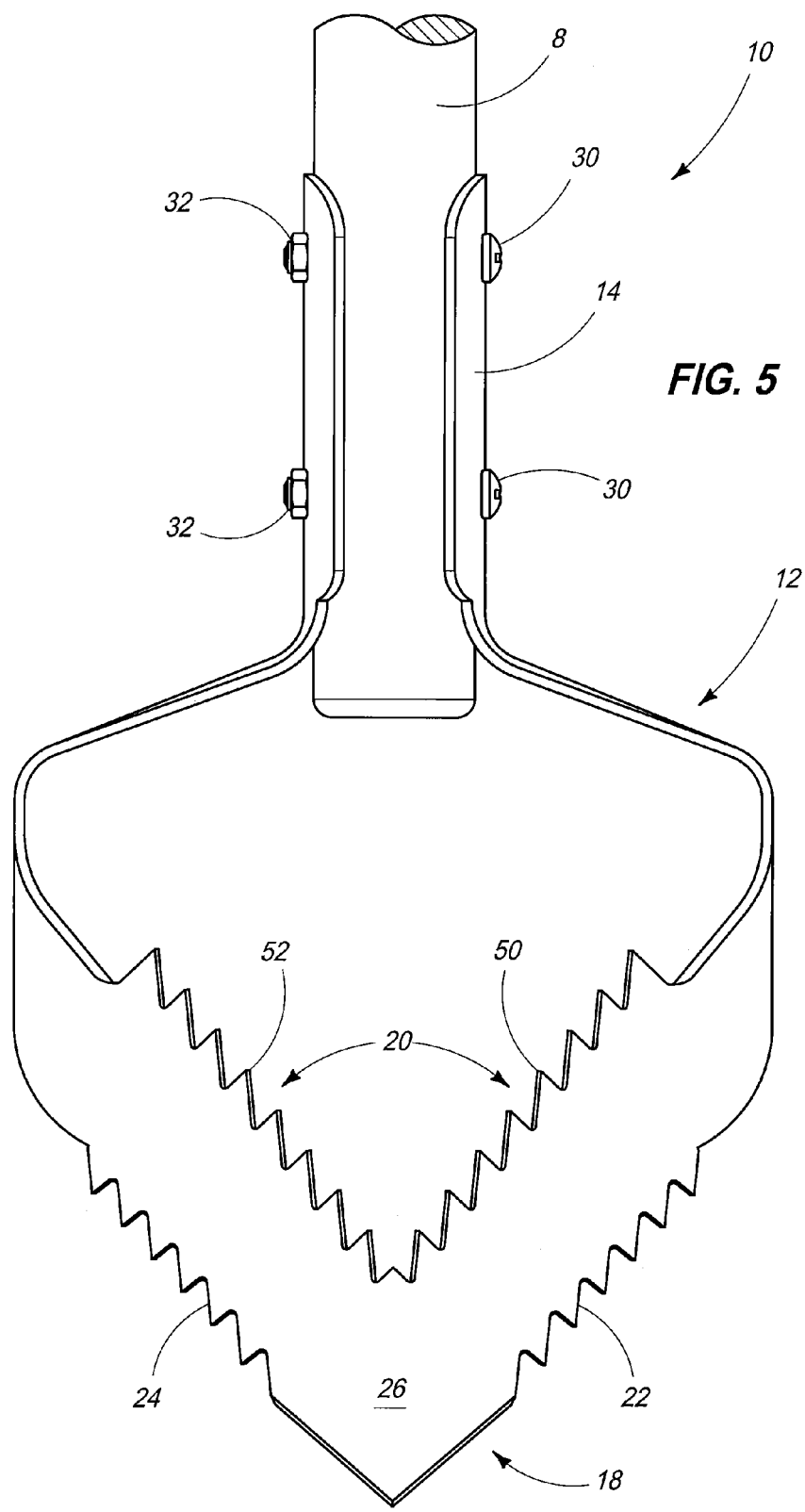
FIG. 5 is bottom view of a tool head and a portion of a handle according to an embodiment.

FIG. 5 shows a bottom view of tool head 10 coupled to handle 8 via coupling mechanism 14. Bottom portion 26 is also shown. Coupling mechanism 14 is shown to partially encircle handle 8 similarly as shown in FIG. 4.

Additionally, leading edge 18; segments 24 and 22 of leading edge 18; trailing edge 20; and segments 50 and 52 of trailing edge 20 are shown. According to this embodiment, segment 50 of trailing edge 20 and segment 22 of leading edge 18 are aligned in a substantially parallel manner. However, according to other embodiments, segment 50 of trailing edge 20 and segment 22 of leading edge 18 may be aligned in an unparallel manner. Similarly, segment 52 of trailing edge 20 and segment 24 of leading edge 18 are aligned in a substantially parallel manner. However, according to other embodiments, segment 52 of trailing edge 20 and segment 24 of leading edge 18 may be aligned in an unparallel manner.

Figure 6:
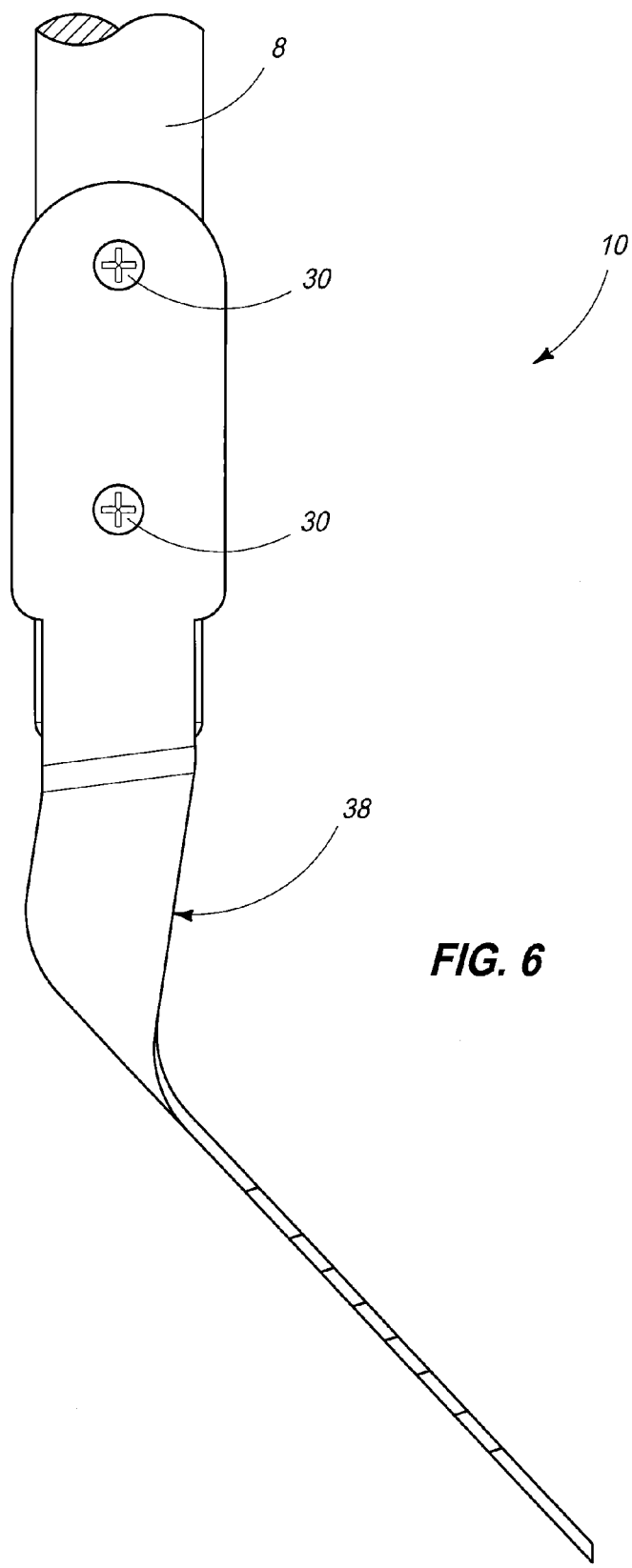
FIG. 6 is a side view of a tool head and a portion of a handle according to an embodiment.

FIG. 6 shows a side view of tool head 10 coupled to handle 8 via coupling mechanism 14. Side strip 38 and screw-type fasteners 30 are also shown in this view.

Figure 7:
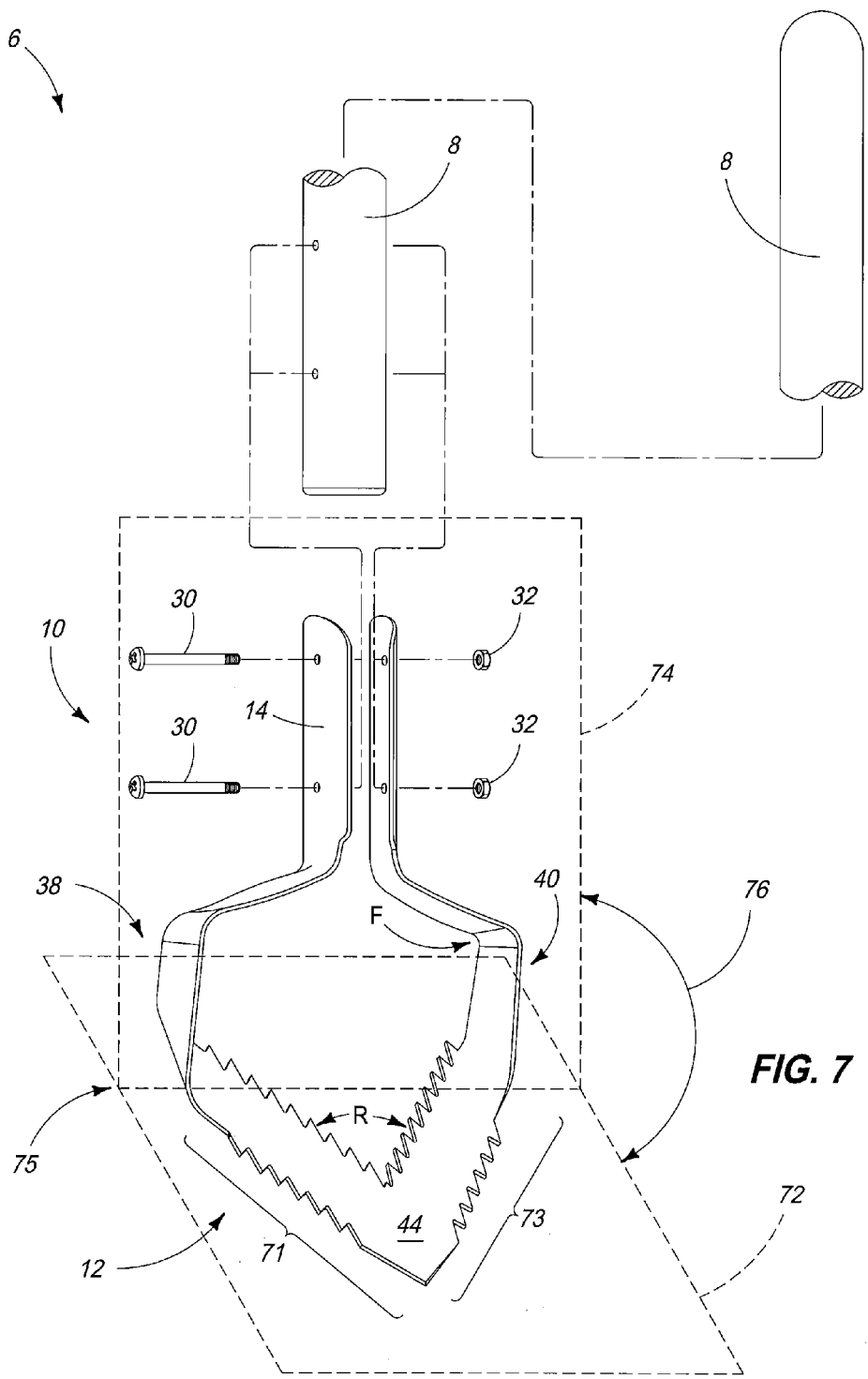
FIG. 7 is an exploded view of a tool head, a coupling mechanism, and a handle according to an embodiment.

Referring next to FIG. 7, an exploded view of multi-use tool 6 is shown according to one embodiment. According to this embodiment, tool head 10 is constructed of one piece of rigid material. Side strip 38 and side strip 40 are shown. The unique shape of chevron-shaped body 12 is accentuated according to this view. Radius F is clearly shown. According to this embodiment, top portion 44 is located in a first plane and side strips 38 and 40 are located in different planes.

According to another embodiment, the length of handle 8 may adjustable. Such adjustability may be attained by, for example, a plurality of telescoping handle segments. Each segment, with the exception of the first and last segment, would be constructed to be able to receive a smaller segment and index within a larger segment. Additionally, such adjustability may be attained by screwing a turn screw, which allows movement of handle 8 or handle segments.

According to an alternative description, tool head 10 includes a first strip of rigid material 71 and a second strip of rigid material 73. Coupling mechanism 14 couples handle 8 at least first strip 71 or second strip 73. Strip 71 and strip 73 are held in a fixed orientation relative to one another and form an acute angle R. In one embodiment, strip 71 and strip 73 are located within a first plane 72. Handle 8, coupling mechanism 14, strip 38, and strip 40 are aligned lengthwise with a second plane 74. Note that first plane 72 and second plane 74 intersect along line 75 forming angle 76, which in one embodiment may be about 135 degrees and in other embodiments may be adjustable.

As depicted in FIG. 7, strips 71 and 73 physically contact each other (e.g., at apex 16). However, in other embodiments, strips 71 and 73 may not contact each other and may be separated by a void.

FIG. 8 shows tool head 10 and chevron-shaped body 12 according to one embodiment. According to this embodiment, chevron-shaped body 12 comprises apex 16, serrated trailing edge 20, and serrated segments 24 and 22 of leading edge 18. According to this embodiment, apex 16 is rounded. Rounded apex 16 may, for example, be desirable to perform certain tasks such as forming a round-bottom trench. Additionally, apex 16 may be rounded for safety reasons or to account for cost considerations.

FIG. 9 shows tool head 10 and chevron-shaped body 12 according to one embodiment. According to this embodiment, chevron-shaped body 12 comprises apex 16, serrated trailing edge 20, and serrated leading edge 18. Particularly, apex 16 is fully serrated. Serration along trailing edge 20 and leading edge 18 may be desirable because, for example, serration may require less maintenance (i.e. sharpened edges dull quicker and must be sharpened) and may hold up longer than edges which are non-serrated or sharpened.

FIG. 10 shows tool head 10 and chevron-shaped body 12 according to one embodiment. According to this embodiment, chevron-shaped body 12 comprises apex 16, trailing edge 20, and leading edge 18. Trailing edge 20 and leading edge 18 are sharpened. According to another embodiment, trailing edge 20 and leading edge 18 may be non-serrated and/or sharpened.

Figure 11:
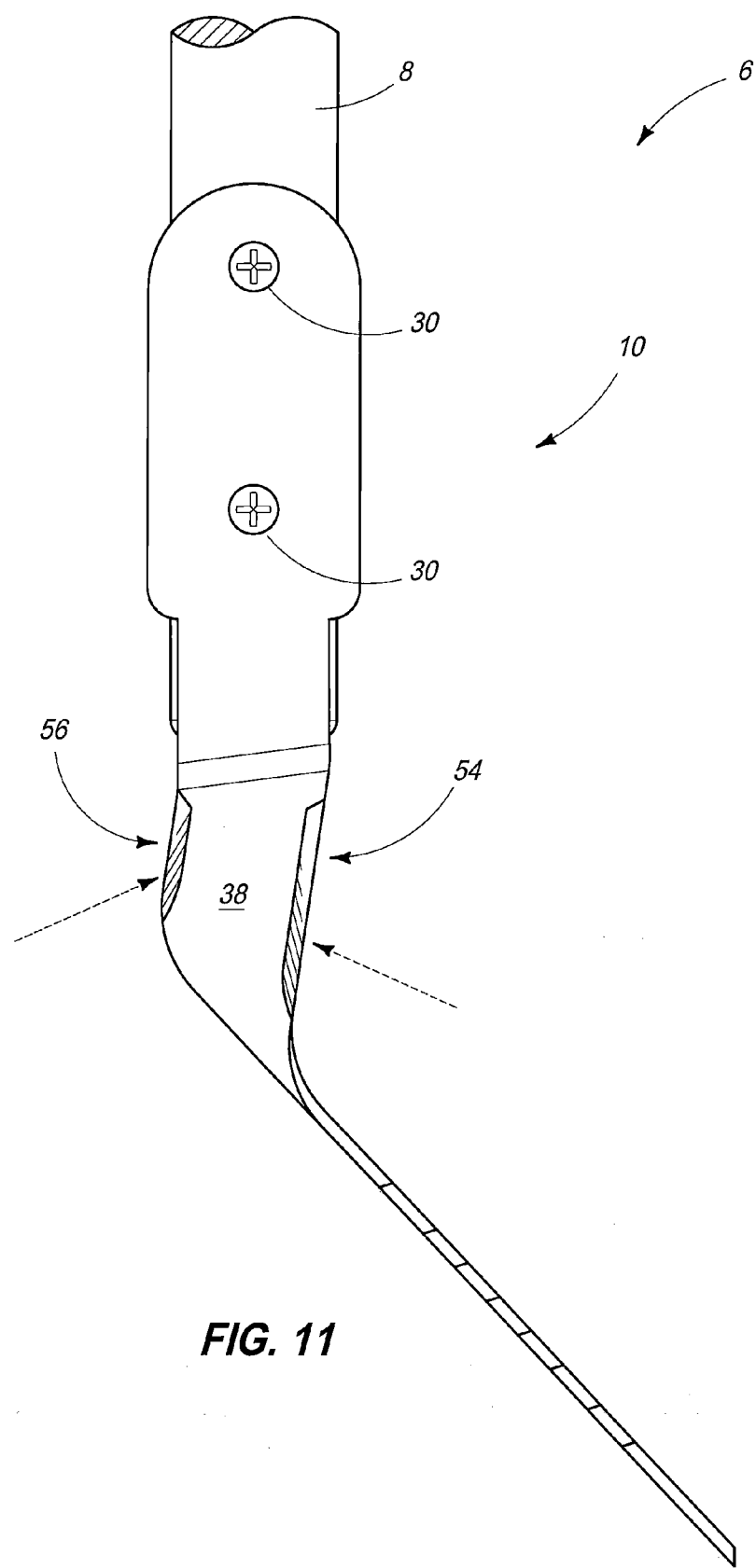
FIG. 11 is a side view of a tool head and a portion of a handle according to an embodiment.

Referring next to FIG. 11, a side view of multi-use tool 6 is shown. According to this embodiment, side strip 38 of tool head 10 comprises forward edge 54 and rearward edge 56. According to this embodiment forward edge 54 is sharpened and rearward edge 56 is sharpened. According to another embodiment, at least one of forward edge 54 and rearward edge 56 may be sharpened. Contrarily, according to another embodiment, neither forward edge 54 nor rearward edge 56 of side strip 38 may be sharpened.

Furthermore, if a force is asserted in the direction of rearward edge 56 and rearward edge 56 of side strip 38 is sharpened, then rearward edge 56 may be used, for example, to cut away sod, turf, weeds, and other foliage to create a smooth clean edge. Additionally, if a force is asserted in the direction of forward edge 54 and forward edge 54 of side strip 38 is sharpened, then, forward edge 54 may be used, for example, to cut away sod, turf, weeds, and other foliage to create a smooth clean edge. One or more edges of side strip 40 may similarly be sharpened.

Figure 12:
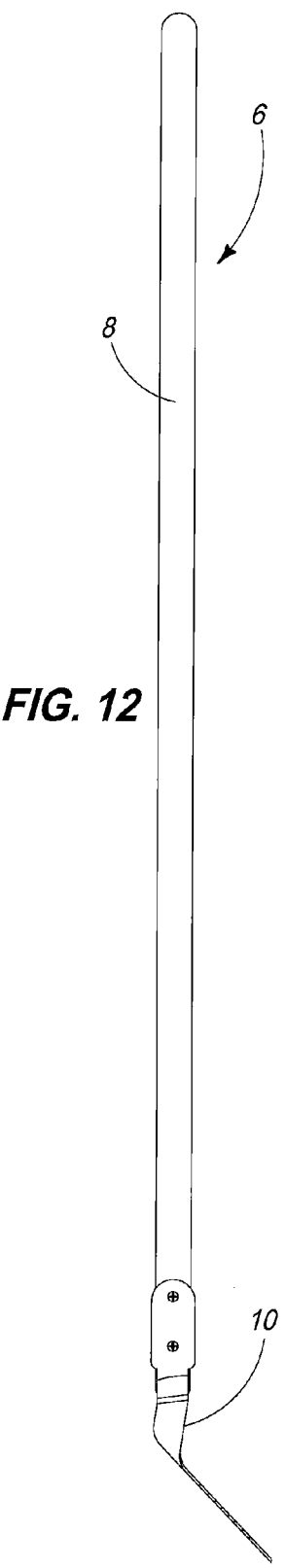
FIG. 12 is side view of a multi-use tool according to an embodiment.

Referring next to FIG. 12, a side view of multi-use tool 6 is shown. Handle 8 is also shown. Handle 8 may comprise, consist essentially of, and/or consist of organic or inorganic materials.

Figure 13:
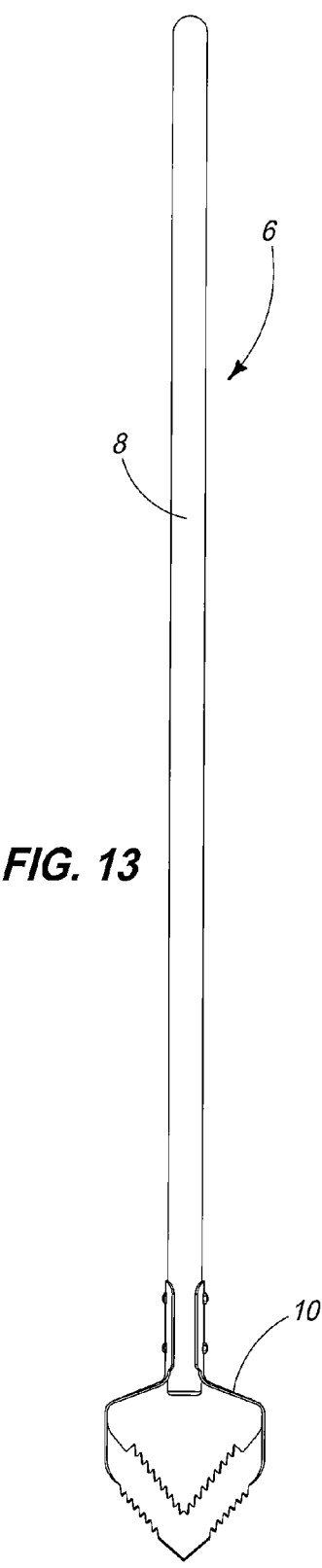
FIG. 13 is a top view of a multi-use tool according to an embodiment.

Referring next to FIG. 13, top elevation view of multi-use tool 6 is shown.

Figure 14:
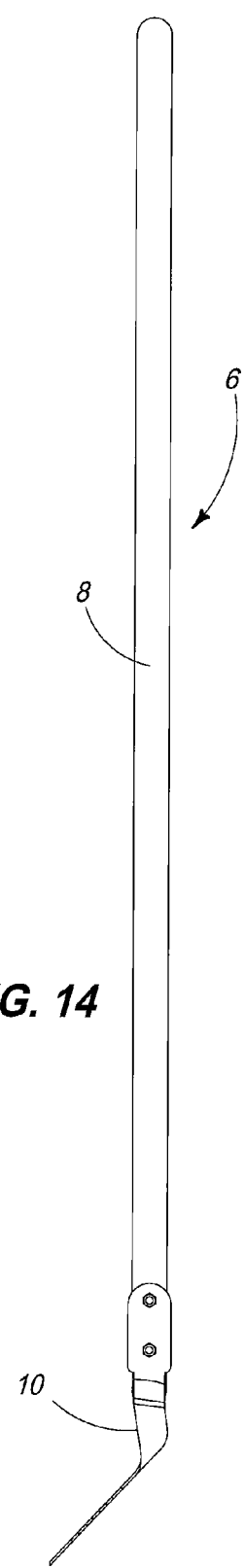
FIG. 14 is a side view of a multi-use tool according to an embodiment.

Referring next to FIG. 14, a side elevation view of multi-use tool 6 is shown.

FIG. 15 shows tool head 10 according to one embodiment.

Figure 15A:
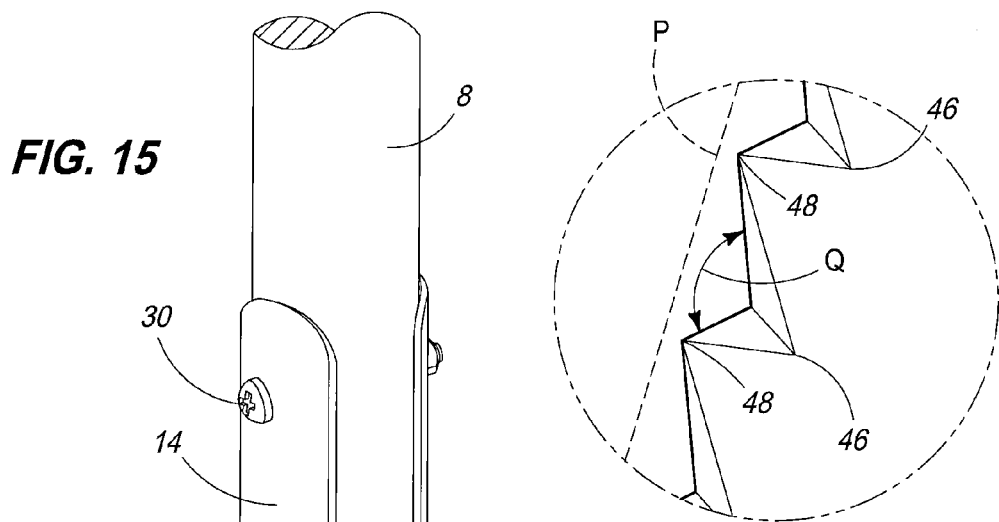
FIG. 15a is a zoomed-in view of a portion of a serrated segment from FIG. 15.
Figure 15:
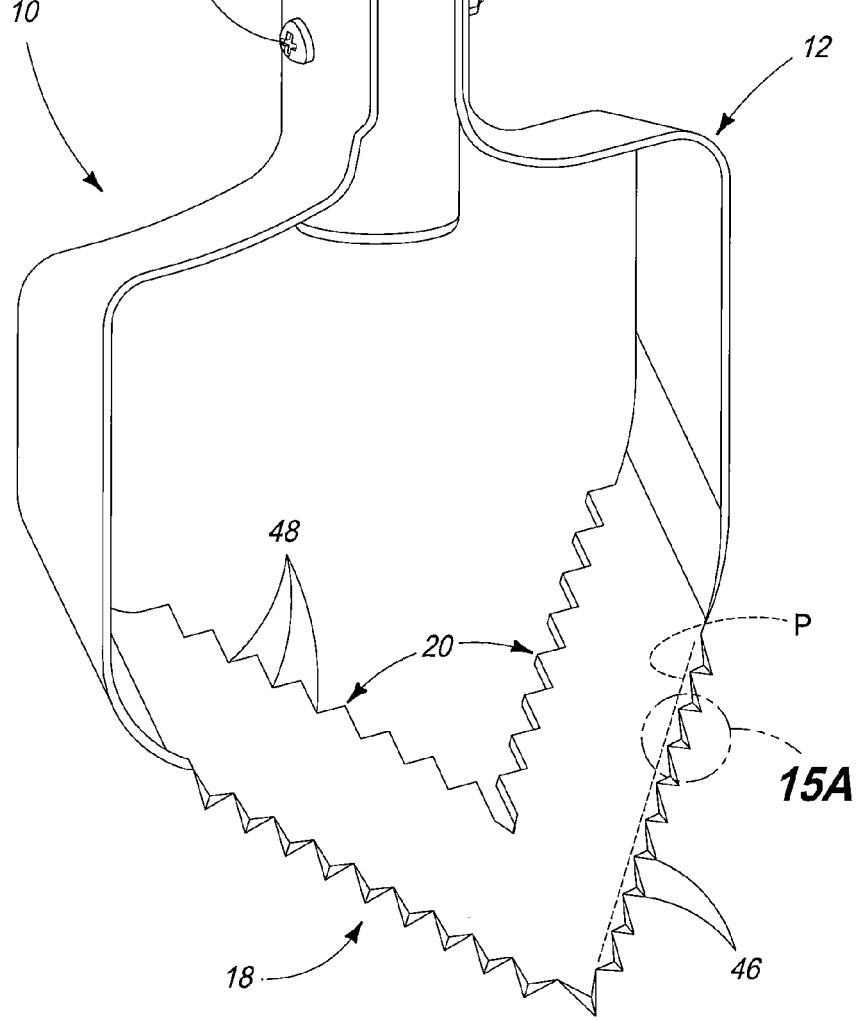
FIG. 15 is an example of a tool head and a handle according to an embodiment.

FIG. 15a is a zoomed-in portion of FIG. 15. According to this embodiment, the serration on trailing edge 20 and leading edge 18 comprises a plurality of teeth 46 and a plurality of gullets 48. Each gullet 48 is separated from the next gullet by an angle Q across tooth 46. Angle Q for each tooth 46 and gullet 48 combination is an angle opposite invisible line P. Invisible line P connects the plurality of gullets 48 of each serrated segment of chevron-shaped body 12. For example, leading edge 18 may be described as comprising tooth 46, gullet 48, and angle Q measured on tooth 46 opposite line P from one gullet 48 to the next. According to this embodiment, angle Q is about 90 degrees. Serration of trailing edge 20 and leading edge 18 may similarly be measured and constructed according to the method for measuring and constructing the serration of leading edge 18 included above. Angle Q may be varied according to additional constructions.

Figure 16:
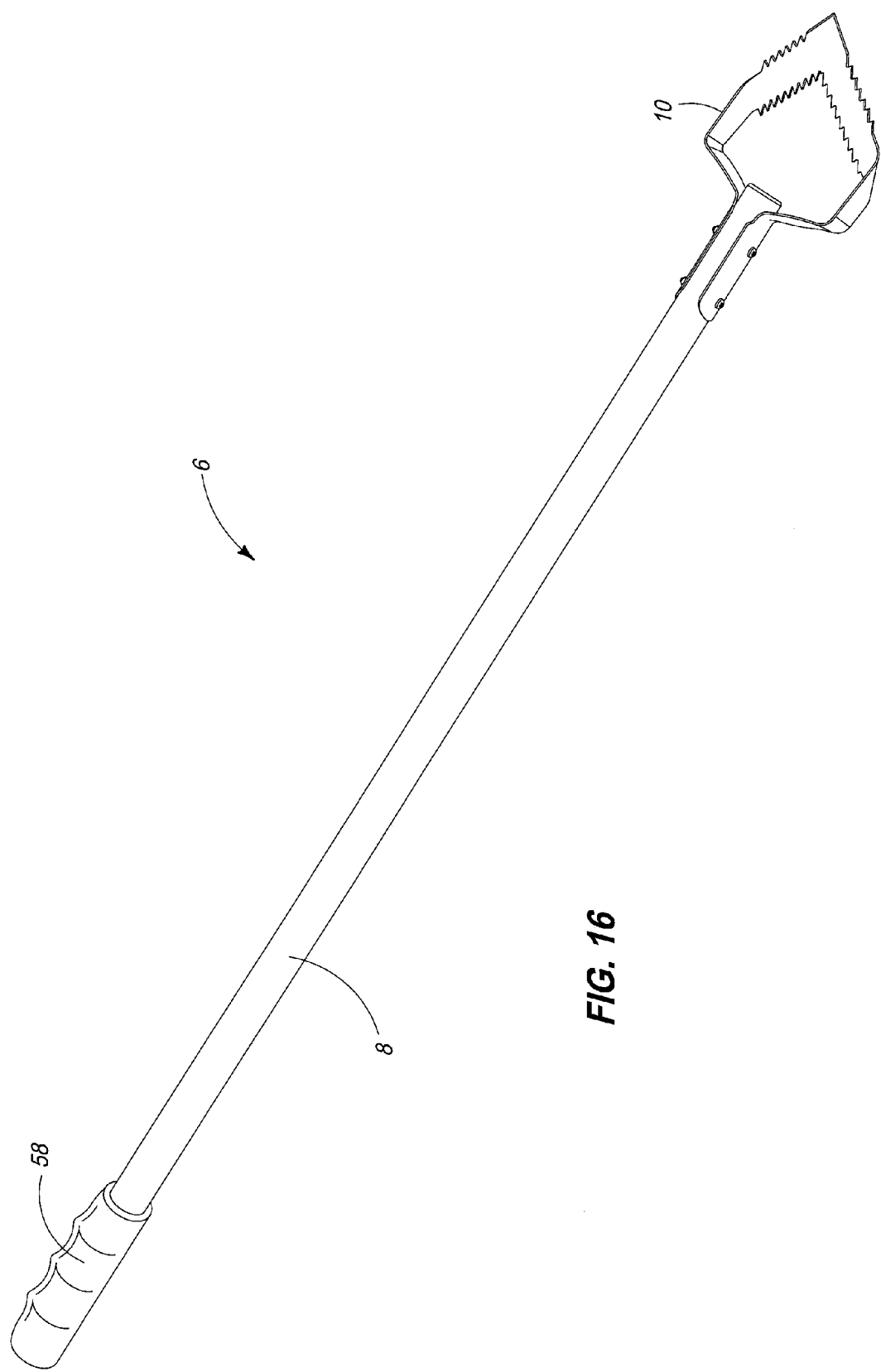
FIG. 16 is an example of a multi-use tool according to an embodiment.

Referring now to FIG. 4a. FIG. 4a is a zoomed-in portion of FIG. 4 and similarly displays a plurality of teeth 46 and a plurality of gullets 48. According to this embodiment, the serration on trailing edge 20 and segments 22 and 24 comprises a plurality of teeth 46 and a plurality of gullets 48. Each gullet 48 is separated from the next gullet 48 by an angle L across tooth 46. For example, angle L for each tooth 46 and gullet 48 combination of segment 24 of leading edge 18 is an angle opposite invisible line M. Invisible line M connects the plurality of gullets 48 of each serrated segment. For example, serrated segment 24 may be described as comprising tooth 46, gullet 48, and angle L measured on tooth 46 opposite line M from one gullet 48 to the next. According to this embodiment, angle Q is less than 90 degrees. Serration of trailing edge 20 and segment 22 of leading edge 18 may similarly be measured and constructed according to the method for measuring and constructing the serration of segment 24 of leading edge 18 included above. Angle L may be varied according to additional constructions. Referring next to FIG. 16, multi-use tool 6 is shown according to an example embodiment. According to this embodiment, handle 8 includes finger grip 58. Finger grip 58 may be attached to handle 8 according to different methods and may comprise different materials. For example, finger grip 58 may comprise foam, rubber, plastic, or any other suitable material. Additionally, finger grip 58 may contour to user's 62 hand as user 62 performs gardening and non-gardening tasks. Finger grip 58 may, for example, minimize soreness to user's 62 hands from extended use of multi-use tool 6. Additionally, finger grip 58 may, for example, increase friction between user's 62 hand and the grip thereby allowing user 62 to transfer more force via tool head 10 to the task being performed.

Figure 17:
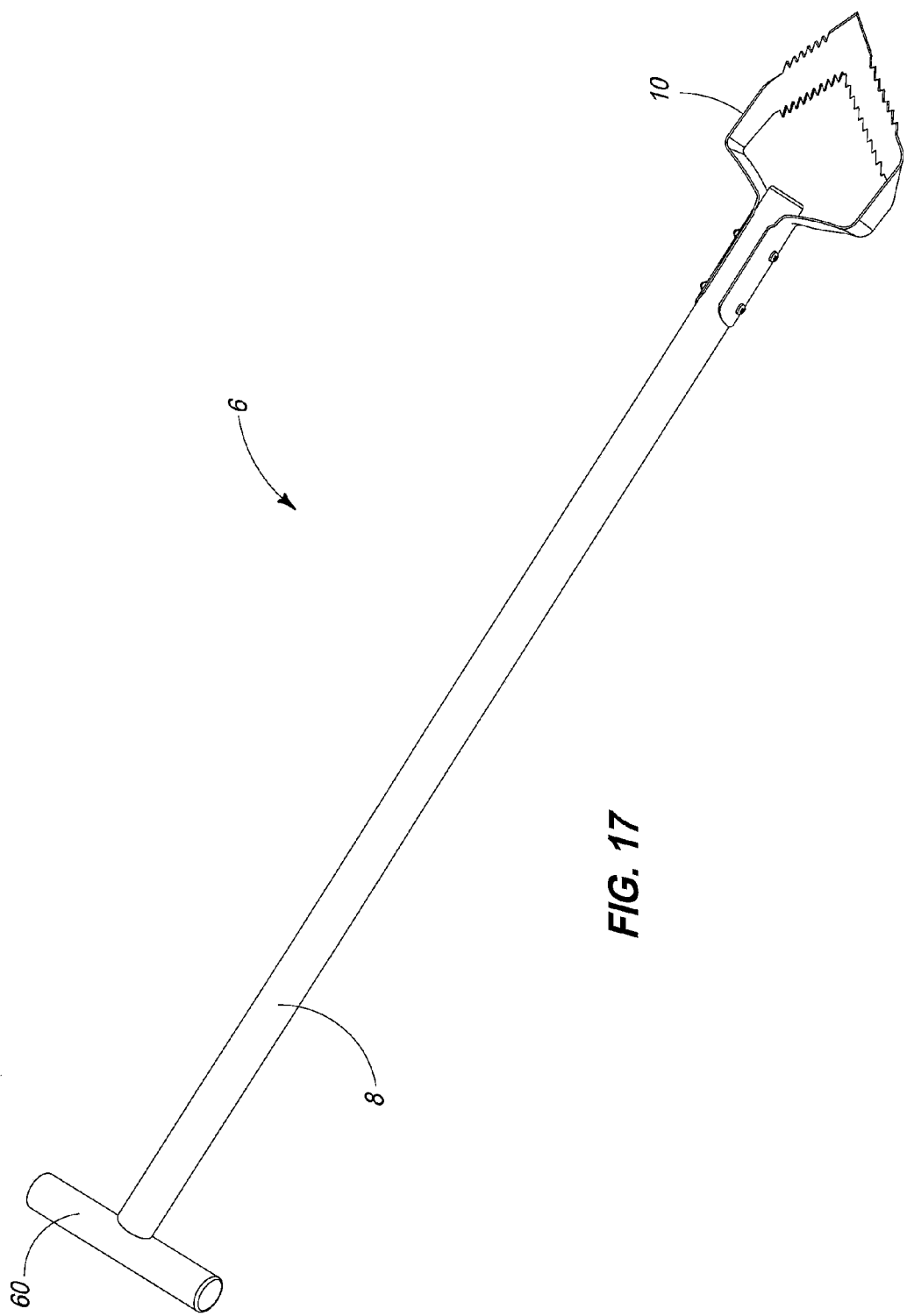
FIG. 17 is an example of a multi-use tool according to an embodiment.

Referring next to FIG. 17, multi-use tool 6 is shown according to an example embodiment. According to this embodiment handle, 8 includes "T" handle 60. "T" handle 60 may be attached to handle 8 according to different methods and may comprise different compositions. For example, "T" handle 60 may comprise wood, composite, plastic, or any other suitable material. Additionally, "T"

handle 60 may provide a secure location for user 62 to grasp handle 8 in performing gardening and non-gardening tasks. "T" handle 60 may provide a location for easily grabbing multi-use tool 6, pushing multi-use tool 6, and pulling multi-use tool 6. "T" handle 60 may, for example, minimize soreness to user's 62 hands from extended use of multi-use tool 6. Additionally, "T" handle 60 may, for example, allow user 62 to effectively use two hands to assert force while performing gardening and non-gardening tasks.

FIG. 18 shows user 62 performing a gardening task with multi-use tool 6 according to an example embodiment. According to this embodiment, user 62 uses multi-use tool 6 to cut weeds 64. User 62 may, for example, align multi-use tool 6 such that chevron-shaped body 12 is aligned with the ground and then by applying forward force 68 and backward force 70 user 62 may be able to create cut weeds 66 in both directions. Cut weeds 66 have been cut or otherwise removed by multi-use tool 6. The unique design of tool head 10 allows weeds 64 to be undercut by chevron-shaped body 12 without significantly disrupting the soil. If user 62 continues to apply forward force 68 and backward force 70 to weeds 64, they too will become cut weeds 66.

Furthermore, FIG. 18 shows the ergonomic design of multi-use tool 6. The design may be ergonomic because tool head 10 may be aligned in such a manner that using multi-use tool 6 to perform gardening and non-gardening tasks may not involve user 62 bending over. Handle 8 may be positioned to land at about user's 62 waist.

Although FIG. 18 shows user 62 performing the task of cutting weeds 64, other embodiments and features of multi-use tool 6 have been described in this disclosure.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A long handled gardening tool comprising a stamped single piece tool head coupled to a long handle, the long handle being of a length to allow for manipulation of substrate supporting a tool operator with the operator in a standing position upon the substrate, the stamped single piece tool head comprising:
   opposing coupling members embracing opposing sides of one end of the long handle;
   each individual coupling member extending to a lateral member, each lateral member extending to a strip;
   each strip merging to define sides of a chevron;
   the chevron, strips, and lateral members defining an opening within the tool head;
   the chevron being angled from the strips and defining a base, the base supporting the tool upon the substrate during the manipulation of the substrate by the operator;
   the chevron further defining individual leading and trailing edges extending to an apex of the chevron;
   each of the individual leading edges defining a group of pointed teeth and gullets bounded by two straight portions;
   one of the two straight portions extending between strips and the group of pointed teeth and gullets;
   the other of two straight portions extending between the apex and the group of pointed teeth and gullets;
   the other two straight portions merging to form the apex, and being beveled; and
   the trailing edges defining a plurality of pointed teeth and gullets extending the entire length of each of the trailing edges; and wherein on each leading edge, each of the one straight portion is recessed from the tips of the pointed teeth and the other straight portion.

2. The tool of claim 1 wherein the tool head comprises steel.

3. The tool of claim 1 wherein the teeth of the leading and/or trailing edges are sharpened.

4. The tool of claim 1 wherein the teeth of the leading edge comprises a point extending in the same direction as the apex.

5. The tool of claim 1 wherein the straight portions of each individual leading edge are of equivalent length.

6. The tool of claim 1 wherein the teeth of the trailing edge comprises a point extending in the opposite direction as the apex.

7. The tool of claim 1 wherein the teeth of the leading edge extend in an opposite direction to the teeth of the trailing edge.

8. The tool of claim 1 wherein the base is flat.

9. The tool of claim 1 wherein on each leading edge, each of the other straight portion is aligned with the tips of the pointed teeth.

* * * * *